(12) United States Patent
Iizuka

(10) Patent No.: US 6,310,726 B1
(45) Date of Patent: Oct. 30, 2001

(54) IMAGE PROJECTING DEVICE

(75) Inventor: Takashi Iizuka, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/442,461

(22) Filed: Nov. 18, 1999

(30) Foreign Application Priority Data

Nov. 20, 1998 (JP) .................................................. 10-331517

(51) Int. Cl.⁷ .......................... G02B 27/10; G02B 27/14; G02B 3/00
(52) U.S. Cl. ............................ 359/618; 359/649; 359/634
(58) Field of Search .................................... 359/619, 629, 359/634, 618, 649, 663, 813; 353/49, 50, 51, 70, 101

(56) References Cited

U.S. PATENT DOCUMENTS

| | | | |
|---|---|---|---|
| 4,943,154 | * 7/1990 | Miyatake et al. | 353/31 |
| 5,069,537 | * 12/1991 | Kitagishi | 359/557 |
| 5,179,398 | 1/1993 | Iizuka | 353/30 |
| 5,283,599 | 2/1994 | Tejima et al. | 353/37 |
| 5,701,205 | * 12/1997 | Hasushita et al. | 359/691 |
| 5,798,864 | * 8/1998 | Sekiguchi | 359/559 |
| 5,801,812 | * 9/1998 | Lo et al. | 355/22 |
| 5,812,223 | 9/1998 | Noguchi | 349/9 |
| 5,895,110 | * 4/1999 | Okada et al. | 353/31 |
| 5,926,316 | * 7/1999 | Sugawara | 359/557 |
| 6,113,240 | * 9/2000 | Iizuka | 353/31 |
| 6,142,634 | * 11/2000 | Ogawa et al. | 353/38 |
| 6,183,094 | * 2/2001 | Ohta | 353/38 |

FOREIGN PATENT DOCUMENTS 5-27324   2/1993   (JP) .
8-62566   3/1996   (JP) .

* cited by examiner

*Primary Examiner*—Georgia Epps
*Assistant Examiner*—Saeed Seyrafi
(74) *Attorney, Agent, or Firm*—Greenblum & Bernstein, P.L.C.

(57) ABSTRACT

An image projecting device is provided with a light source, a modulating device that modulates the light emitted by the light source in accordance with an image to be projected, and a projecting lens that receives the light emitted by the light source and modulated by the modulating device, and projects the modulated light on a screen to form an image. The image projecting device is further provided with a relay lens system which is provided between the modulating device and the projecting lens. The relay lens system is made movable in at least one direction perpendicular to an optical axis of the projecting lens to shift the image on the screen.

8 Claims, 2 Drawing Sheets

IMAGE PROJECTING DEVICE

BACKGROUND OF THE INVENTION

Figure 1:
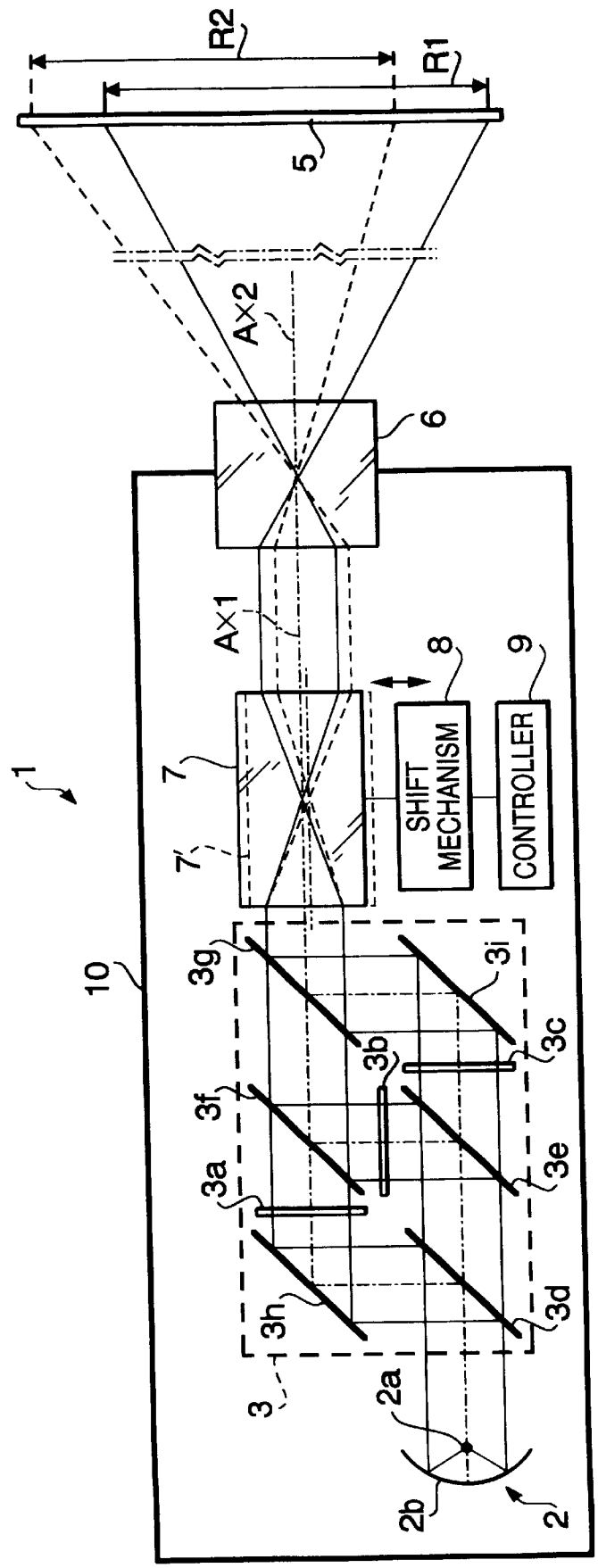

The present invention relates to an image projecting device for projecting an image on a screen, and capable of shifting the image projected on the screen in a direction parallel to the screen.

As an example of such an image projecting device, in Japanese Patent Provisional Publication HEI 5-27324, an image projecting device employing a liquid crystal device is described. In the image projecting device described in the publication, parallel light is emitted by a light source and passes through a transmission type liquid crystal panel. The liquid crystal panel is driven to modulate the beam transmitting therein. The light beam passed through and modulated by the liquid crystal panel is projected on a screen via a condenser lens and an image projecting lens.

The condenser lens and the image projecting lens are mounted on a lens shift mechanism so as to be unitarily movable in a direction perpendicular to an optical axis of the image projecting lens. By shifting the condenser lens and the image projecting lens in the direction perpendicular to the optical axis, the image projected on the screen is shifted in the direction parallel to the screen without the keystone distortion.

Generally, various members of the image projecting device are accommodated in a casing, while the image projecting lens is arranged to be protruded from the casing. When the image projecting device is carried, such a protruded part may be inadvertently used in the manner of a handle, i.e., that the weight of the projector may be inappropriately supported on the protruding lens. If the projecting lens is made shiftable as described in the publication, when the protruded part of the image projecting lens is grasped and the image projecting device is lifted or carried to change a location of the image projecting device, undesirable force may be applied to the lens shifting mechanism and the mechanism may be broken.

Further, in the conventional structure of the image projecting device, a relatively large opening should be formed on the casing where the projecting lens is protruded in order to allow the projecting lens to move in the direction perpendicular to its optical axis. Therefore, a space is formed between the outer circumference of the projecting lens and the inner circumference of the opening, which deteriorates the appearance of the image projecting device.

SUMMARY OF THE INVENTION

It is therefore an object of the present invention to provide an improved image projecting device. Even if the projecting lens protruded from the casing is grasped to lift the device, the lens shifting mechanism is not damaged. Further, the appearance is improved by eliminating space between the projecting lens and the inner circumferential of the opening through which the image projecting lens is protruded.

For the above object, according to the present invention, there is provided an image projecting device, which is provided with: a light source for emitting light; a modulating device that modulates the light emitted by the light source in accordance with an image to be projected; a projecting lens that receives the light emitted by the light source and modulated by the modulating device, and projects the modulated light on a screen; and a relay lens system provided between the modulating device and the projecting lens, the relay lens system being movable in at least one direction perpendicular to an optical axis of the projecting lens.

Since the image projected on the screen is shifted by shifting the relay lens which is located between the projecting lens and the modulating device, the projecting lens is not necessarily be moved, and can be fixed to a casing of the image projecting device. Therefore, even if the projecting lens is grasped by a user for lifting the device, the lens shifting mechanism is not damaged. Further, the appearance is improved since there is no space between the projecting lens and the inner circumferential of the opening through which the image projecting lens is protruded from the casing of the image projecting device.

Specifically, the relay lens is telecentric both on a modulating device side and on a projecting lens side, and the projection lens is telecentric on the relay lens side.

Optionally, the projection lens may be arranged such that an optical axis of the projection lens is shifted, with respect to a central axis of said modulating elements, in a direction perpendicular to the central axis of the modulating device. Alternatively, the projection lens may be arranged such that the optical axis of the projection lens coincides with a central axis of the modulating device.

The modulating device maybe configured to form a color image. For example, the modulating device may include: a plurality of transparent type liquid crystal panels capable of modulating different color components; a first set of dichroic mirrors provided between the light source and respective modulating elements, the dichroic mirrors limiting wavelength ranges of light entering the modulating elements, respectively; and another set of dichroic mirrors are provided between the relay lens and the modulating elements for combining light modulated by the modulating elements.

According to another aspect of the invention, there is provided an image projecting device, which is provided with: an image source that forms an image to be projected; a projecting lens that projects the image formed by the image source on a screen, the projecting lens being unmovable with respect to the image projecting device; and a relay lens system provided between the image source and the projecting lens, the relay lens system being movable in at least one direction perpendicular to an optical axis of the projecting lens.

BRIEF DESCRIPTION OF THE ACCOMPANYING DRAWINGS

Figure 2:
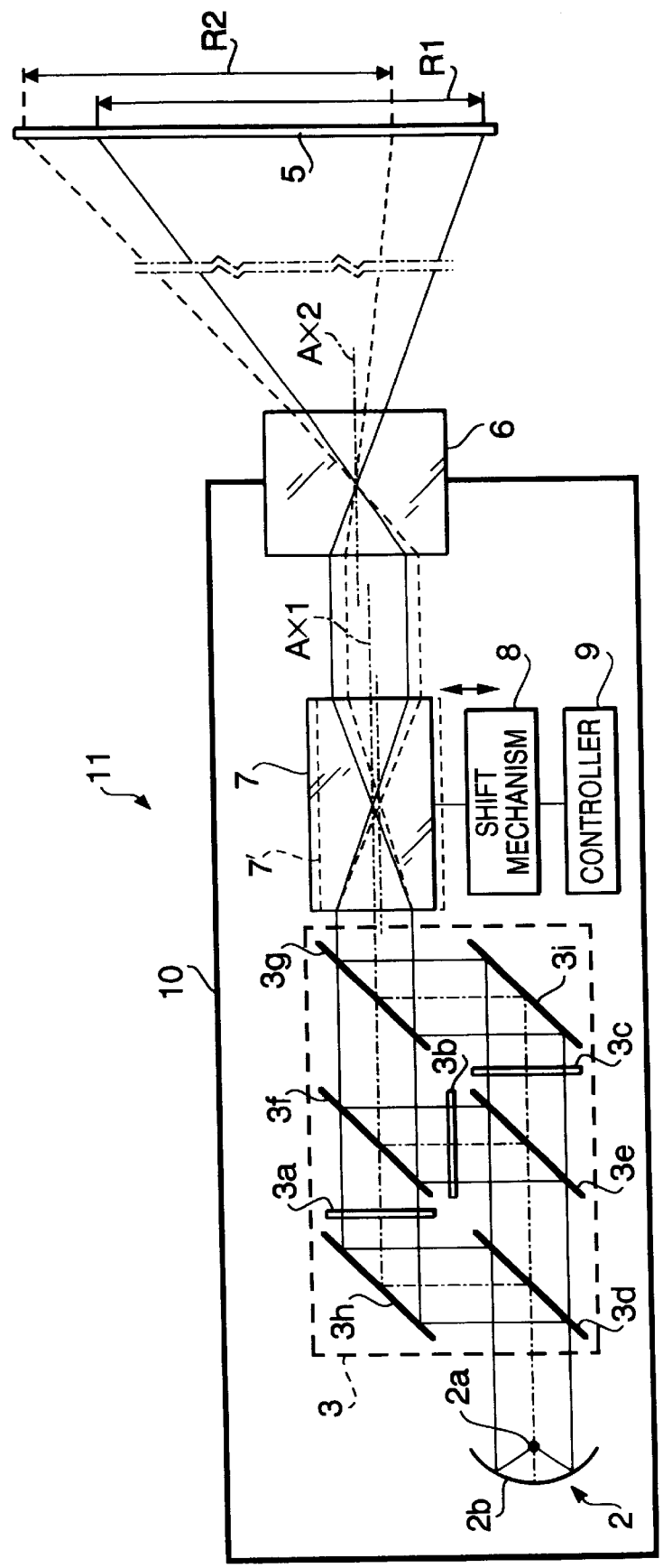

FIG. 1 is a diagram illustrating an arrangement of optical elements according to a first embodiment of the invention; and FIG. 2 is a diagram illustrating an arrangement of optical elements according to a second embodiment of the invention.

DESCRIPTION OF THE EMBODIMENTS

The present invention will be described with reference to the accompanying drawings.

FIG. 1 shows an arrangement of optical elements of an image projecting device 1 according to a first embodiment of the invention. An optical system of the image projecting device 1 shown in FIG. 1 includes:

a light source unit 2 for emitting light;

a modulation unit 3 for modulating the light emitted by the light source 2 in accordance with image data (image to be projected);

a projecting lens 6 for projecting light emitted by the light source unit 2 and modulated by the modulation unit 3 onto a screen 5;

a relay lens 7 provided between the projecting lens 6 and the modulation unit 3.

The relay lens 7 is movable in at least one direction that is perpendicular to the optical axis thereof.

As shown in FIG. 1, the light source unit 2, the modulation unit 3, the relay lens 7 are arranged inside a casing 10, while the projecting lens 6 is fixed to the casing 10. A part of the projecting lens 6 is protruded from the casing 10.

The light source unit 2 is provided with a high illumination lamp 2a such as a xenon lamp, a halogen lamp, a metal halide lamp, a super high pressure mercury-vapor lamp, or the like, and a reflector 2b for directing the light emitted by the lamp 2a to the modulation unit 3 as parallel light.

The modulation unit 3 includes three transmission-type liquid crystal panels 3a, 3b and 3c for modulating three primary color components B (blue), R (red) and G (green), respectively. Hereinafter, the liquid crystal panels 3a, 3b and 3c will be referred to as B, R and G LC panels, respectively.

Between the light source unit 2 and liquid crystal panels, dichroic mirrors 3d and 3e for limiting a wavelength range of light incident on each liquid crystal panel, and dichroic mirrors 3f and 3g for combining light fallen within respective wavelength ranges.

White light is emitted by the light source unit 2, and firstly is incident on the first dichroic mirror 3d. By the first dichroic mirror 3d, the light is divided into a B component and the remainder. The B component is reflected by the first dichroic mirror 3d. The B component is then incident on a mirror 3h, reflected thereby, and is incident on the B LC panel 3a for modulating the B components. The light passed through the first dichroic mirror 3d is divided into G and R components by the second dichroic mirror 3e. The R component is reflected by the second dichroic mirror 3e and incident on the R LC panel 3b for modulating the R component. The G component which passed through the second dichroic mirror 3e is incident on the G LC panel 3c for modulating the G component.

As described above, by employing two dichroic mirrors 3d and 3e, the white light can be divided into three color components. The divided color components are made incident on liquid crystal panels for modulating respective color components. The light beam passed through the B LC panel 3a and the light beam passed through the R LC panel 3b are combined by a third dichroic mirror 3f, which reflects at least the R component and allows the B component to pass through, and the combined light beam is incident on the fourth dichroic mirror 3g. The light beam passed through the G LC panel 3c is incident on the fourth dichroic mirror 3g via the mirror 3i. The fourth dichroic mirror 3g has a characteristic of reflecting the G component, and allowing the other components to pass therethrough. Accordingly, the R, G and B components are combined by the fourth dichroic mirror 3g.

The relay lens 7 is telecentric on both the modulation unit side and the projection lens side. The projection lens 6 is telecentric on the relay lens side. With this structure, when the relay lens 7 shifts in the direction perpendicular to the optical axis thereof, it is possible to prevent the light beam emerged by the modulation unit 3 from shifting out of a pupil of the projection lens 6. Further, in the first embodiment, the projection lens 6 is arranged such that the central axis Ax1 of the LC panels, which is defined as an axis perpendicular to each of the LC panels when effects of the mirrors 3d–3i are taken into account and passes the center of each LC panel, coincides with the optical axis Ax2 of the projection lens 6.

The image projecting device 1 is further provided with a shift mechanism 8 for shifting the relay lens 7 in at least one direction that is perpendicular to the optical axis thereof. In this embodiment, the shift mechanism 8 shifts the relay lens 7 in the direction indicated by arrow in FIG. 1 (i.e., up and down direction in FIG. 1). The shift mechanism 8 is an electrically controllable mechanism provided with a driving device such as a motor. When an operator operates a shift switch (not shown) provided in a controller 9, the controller 9 controls the driving device to shift the relay lens 7. Alternatively or optionally, the shift mechanism 8 may be constructed to be manually operated to shift the relay lens 7.

According to the above-described structure, by moving the relay lens 7 in the direction perpendicular to the optical axis thereof, the area on the screen where the image is projected is shifted on the screen without the image being distorted.

When the relay lens 7 is located at a reference position, as indicated by a solid line in FIG. 1, the optical axis of the relay lens 7 coincides with the optical axis Ax2 of the projection lens 6. In this case, the image projection area R1 on the screen 5 is symmetrical with respect to the optical axis Ax2 of the projection lens 6. When the relay lens 7 is moved to a position 7', which is indicated by broken lines in FIG. 1, the optical path changes as indicated by broken lines, and the image projection area is shifted to an area R2.

The projection lens 6 is protruded from the casing 10, but fixedly secured thereto. Accordingly, even if the projection lens 6 is grasped by the user when the device is carried, the moving mechanism 8 is not affected. Further, since the projection lens 6 is fitted in the opening formed on the casing, and no clearance is formed between the projection lens 6 and the inner circumference of the opening, the appearance of the image projection device is improved in comparison with the conventional image projection device.

In order to project a color image, a plurality of liquid crystal panels should be used. Further, in order to combine respective color components, dichroic mirrors should be arranged between the liquid crystal panels and the projection lens, which requires a relatively long distance between the projection lens and respective liquid crystal panel. Therefore, if there is no relay lens, the projection lens 6 should have a relatively long back focus. On the other hand, in order to project a big image with decreasing a distance between the image projection device 1 and the screen 5, it is preferable that the focal length of the projection lens 6 is short. It is however difficult to design a lens having a relatively short focal length and a relatively long back focus. In order to obtain a sufficient performance with such a lens, the number of lens elements of the projection lens 6 increases, which increases weight and cost.

According to the first embodiment, by arranging the relay lens 7 between the liquid crystal panels and the projection lens 6, the condition of the back focus required to the projection lens 6 is loosened, and therefore, the weight and cost of the projection lens 6 can be suppressed.

Second Embodiment

FIG. 2 schematically shows an arrangement of the optical elements of the image projection device 11 according to a second embodiment. The image projection device 11 includes, similarly to the image projection device 1 according to the first embodiment, the light source 2, the modulating unit 3, the image projection lens 6, the relay lens 7. The image projection device 11 forms a color image on the screen 5. The relay lens 7 is made movable in the vertical direction by the shift mechanism 8 which is controlled to driven by the controller 9. The above-described elements are accommodated in the casing 10, and only a part of the projection lens 6 is protruded to outside from the casing 10. The projection lens 6 is securely fixed to the casing 10.

A difference between the first and second embodiment is that the optical axis Ax2 of the projection lens 6 is shifted in an upper direction in FIG. 2 with respect to the central axis Ax1 of the LC panels, in the second embodiment.

When the relay lens 7 is located at a reference position (i.e., the initial/neutral position), the optical axis thereof coincides with the central axis Ax1 of the LC panels. Since the optical axis Ax2 of the projection lens 6 is shifted upwardly with respect to the central axis Ax1 of the LC panels, the center of the image projection area R1 on the screen 5 is shifted upwardly with respect to the optical axis Ax2 of the projection lens 6.

If the relay lens 7 is moved to a position 7' as indicated by broken lines in FIG. 2, the optical path shifts as shown in FIG. 2, and accordingly, the image projection area R2 is shifted further in the upward direction in FIG. 2.

Generally, the image projection device such as the liquid crystal projector, the device and the audience are on the same side with respect to the screen. Therefore, in order to avoid the image projection device obstacles the audience Is view, the device is located such that the image is projected from an upper position or lower position with respect to the screen 5. In such a situation, in order to prevent a keystone distortion, the optical axis of the optical system should be made substantially normal to the screen. Therefore, in order to project an image at a position which is shifted with respect to the image projection device without causing the keystone distortion, a lens is shifted in an upward or downward direction with respect to a central axis of the modulation unit.

The relay lens 7 is shiftable in a direction perpendicular to the optical axis thereof. Accordingly, it is possible to shift the image only by moving the relay lens 7. In such a configuration, however, the amount of shift of the relay lens 7 increases. If the relay lens 7 has a relatively large diameter, the shifting mechanism 8 should also be made larger.

If a usage of the image projection device is determined in advance, e.g., to be placed on a desk or hung from a ceiling, the direction in which the image projection area is to be shift can be known in advance. Thus, for such a use, the image projection device may by designed such that the projection lens 6 is shifted in accordance with the shifting direction of the image in advance, and the relay lens 7 may be moved only for a fine adjustment. According to such a constitution, the amount of the shift of the relay lens 7 can be made as small as possible, and thereby reducing the load applied to the shift mechanism 8.

As described above, according to the present invention, by shifting the relay lens located between the image projection lens and the image modulating elements, the image projected on a screen can be shifted by shifting the relay lens. Thus, the projection lens can be secured to the casing, and a clearance between the projection lens 6 and an opening of the casing can be eliminated, which improves the appearance of the image projection device. Further, since the image projection lens is fixed to the casing, even if it is grasped by the user, no force is applied to the shift mechanism.

Further, by forming the image projection lens and relay lens as telecentric systems, it becomes possible to prevent the beam emerged from the modulation element from being out of a pupil of the image projection lens even when the relay lens is shifted.

The present disclosure relates to the subject matter contained in Japanese Patent Application No. HEI 10-331517, filed on Nov. 20, 1998, which is expressly incorporated herein by reference in its entirety.

What is claimed is:

1. An image projecting device, comprising:
   a light source for emitting light;
   a modulating device that modulates the light emitted by said light source in accordance with an image to be projected;
   a projecting lens that receives the light emitted by said light source and modulated by said modulating device, and projects the modulated light onto a screen, said projecting lens being precluded from movement at least in a direction transverse to an optical axis of said projecting lens; and
   a relay lens system provided between said modulating device and said projecting lens, said relay lens system being movable in a direction perpendicular to the optical axis of said projecting lens.

2. The image projecting device according to claim 1, wherein said relay lens is telecentric both on a modulating device side and on a projecting lens side.

3. The image projecting device according to claim 1, wherein said projection lens is telecentric on said relay lens side.

4. The image projecting device according to claim 1, wherein an optical axis of said projection lens is shifted from a central axis of said modulating device in a direction perpendicular to the central axis of said modulating device.

5. The image projecting device according to claim 1, wherein an optical axis of said projection lens coincides with a central axis of said modulating elements.

6. The image projecting device according to claim 1, wherein said modulating device includes a plurality of transparent type liquid crystal panels capable of modulating different color components, wherein a first set of dichroic mirrors are provided between said light source and respective modulating elements, said dichroic mirrors limiting wavelength ranges of light entering said modulating elements, respectively, and wherein another set of dichroic mirrors are provided between said relay lens and said modulating elements for combining light modulated by said modulating elements.

7. An image projecting device, comprising:
   an image source that forms an image to be projected;
   a projecting lens that projects the image formed by said image source on a screen, said projecting lens being unmovable with respect to said image projecting device; and
   a relay lens system provided between said image source and said projecting lens, said relay lens system being movable in at least one direction perpendicular to an optical axis of said projecting lens.

8. An image projecting device, comprising:
   a light source that emits light;
   a modulating device that modulates the light emitted by said light source in accordance with an image to be projected;
   a projecting lens that receives modulated light and that projects the modulated light onto a screen; and
   a relay lens positioned between said modulating device and said projecting lens, said relay lens being moveable independently of said projecting lens in at least one direction perpendicular to an optical axis of said projecting lens.

* * * * *